United States Patent
Bill et al.

(10) Patent No.: US 8,757,585 B2
(45) Date of Patent: Jun. 24, 2014

(54) ACTUATING DEVICE

(75) Inventors: Martin Bill, Nohfelden (DE); Florian Lauer, Saarbrücken (DE)

(73) Assignee: Hydac Electronic GmbH, Saarbrüken (DE)

( * ) Notice: Subject to any disclaimer, the term of this patent is extended or adjusted under 35 U.S.C. 154(b) by 387 days.

(21) Appl. No.: 12/736,734

(22) PCT Filed: Jun. 5, 2009

(86) PCT No.: PCT/EP2009/004038
§ 371 (c)(1),
(2), (4) Date: Nov. 4, 2010

(87) PCT Pub. No.: WO2009/156053
PCT Pub. Date: Dec. 30, 2009

(65) Prior Publication Data
US 2011/0079741 A1    Apr. 7, 2011

(30) Foreign Application Priority Data
Jun. 26, 2008  (DE) .......................... 10 2008 030 454

(51) Int. Cl.
*F16K 31/02*    (2006.01)
(52) U.S. Cl.
USPC ................. 251/129.02; 251/129.15; 335/255; 335/260; 335/281; 335/297; 303/119.2
(58) Field of Classification Search
USPC ........... 251/129.07, 129.15, 129.02; 335/220, 335/260, 255, 281, 297; 303/119.2
See application file for complete search history.

(56) References Cited

U.S. PATENT DOCUMENTS

| | | | | |
|---|---|---|---|---|
| 3,326,511 A | * | 6/1967 | Hallgreen | 251/54 |
| 4,670,508 A | * | 6/1987 | Ohdaira et al. | 525/64 |
| 6,659,421 B1 | * | 12/2003 | Goossens | 251/129.02 |
| 6,679,475 B2 | * | 1/2004 | Rembold et al. | 251/129.14 |
| 7,387,501 B2 | * | 6/2008 | Hirota | 417/222.2 |
| 7,588,229 B2 | * | 9/2009 | Eiser et al. | 251/129.02 |
| 8,081,053 B2 | * | 12/2011 | Yamagata et al. | 335/260 |
| 2003/0136931 A1 | * | 7/2003 | Watanabe et al. | 251/129.15 |
| 2005/0269538 A1 | * | 12/2005 | Haynes et al. | 251/129.15 |
| 2006/0097211 A1 | * | 5/2006 | Spurlock et al. | 251/129.15 |
| 2011/0121218 A1 | * | 5/2011 | Hoppe et al. | 251/129.15 |

FOREIGN PATENT DOCUMENTS

| | | |
|---|---|---|
| DE | 43 19 488 A1 | 12/1994 |
| DE | 101 04 998 A1 | 8/2002 |
| DE | 10 2004 028 871 A1 | 1/2006 |

* cited by examiner

*Primary Examiner* — John Bastianelli
*Assistant Examiner* — Marina Tietjen
(74) *Attorney, Agent, or Firm* — Roylance, Abrams, Berdo & Goodman LLP (57) ABSTRACT

An actuating device, particularly for actuating valves that can be connected externally, includes a housing (10) and a coiled body (12) in the housing and having a coil winding (14). The winding encloses a pole tube (16) at least partially, having a pole core (20) connected at its free end. An armature (22) is guided in a longitudinally displaceable manner at least in the pole tube (16) within an armature chamber (24) and interacts with an actuating device (26) for actuating a valve part. The actuating part (26) is guided within the pole core (20) along an annular body (92), sealing the inside of the pole core (20) and the pole tube (16) relative to the surrounding area.

10 Claims, 10 Drawing Sheets

ACTUATING DEVICE

FIELD ON THE INVENTION

The invention relates to an actuating device, in particular for actuating valves that can be connected externally, comprising a housing and a coil body arranged therein and having a coil winding. The coil body encloses at least in part a pole tube to whose one free end a pole core is connected. An armature is guided to be longitudinally displaceable at least in the pole tube within an armature space and interacts with an actuating part for actuating the respective valve part.

BACKGROUND OF THE INVENTION

These actuating devices, which are also referred to as "actuating or switching magnets" are described, for example, in DE 101 04 998 A1 and are readily available on the market in a plurality of embodiments. The actuating part of the actuating magnet is essentially formed from a tubular pin which traverses a definable path when the coil winding is electrically excited by a connector socket which can be connected to the attachment plug plate. In doing so the actuating part triggers a switching or actuating process, for example, in a valve which is connected externally to shut off and route fluid flows. When no current is supplied and the switching magnet is therefore de-energized, it is generally reset via a reset spring located in the actuating device itself and/or on the valve to be actuated for another actuating process when the coil of the magnet armature is energized.

DE 10 2004 028 871 A1 discloses a generic actuating device in which the shape of the outside periphery of the actuating part is chosen for the shape of the inside periphery of a guide channel in the pole core. At least one fluid-carrying connection from the exterior to the armature space is then established to ensure the fluid-carrying and/or pressure-carrying connection of the valve interior to the interior of the actuating device necessary for proper operation in the form of the armature space via the guide channel. The guide channel is already available to support the actuating part in the pole core with a capacity to move. Since the guide channel is part of standardizable pole cores, in this way the fundamental prerequisite for a modular structure of the known actuating device solution is satisfied.

The cross-sectional surface of the guide channel is delimited by arc-shaped and/or rectilinear wall segments. The cross-sectional surface of the rod-like actuating part, in contrast thereto, is delimited, with the formation of the respective fluid-carrying connection, by further rectilinear and/or arc-shaped wall segments. The further wall segments at least in part are guided on the wall segments of the guide channel when the actuating part is moved. Accordingly, in the known solution, a plurality of possibilities are enabled for implementing the respective fluid-carrying connection by the corresponding configuration of the respective wall segments of the actuating part and the guide channel, guidance of the actuating part along the wall segments of the guide channel in the pole core still being ensured. In the simplest case, the cross-sectional surface of the guide channel is chosen to be round and, and when referenced to its cross section, the actuating part is a rod-shaped polygon. As a result of the cross-sectional surface which remains free, fluid-carrying connections which are dimensioned to be correspondingly large between the valve interior and armature space remain. Flow losses due to turbulent flow are avoided in this way as a result of the rectilinearly running fluid connections. In spite of these advantages, the known solution, with respect to the guidance of the actuating part within the pole core, is relatively complex and therefore expensive to implement. The rod-like actuating part is also guided by the pole core in its back region facing the armature space so that in the front free section region hindrances in operation may occur, to which the polygonal configuration of the actuating part also contributes.

SUMMARY OF THE INVENTION

An object of the invention is to provide an improved actuating device maintaining the prior art advantages while allowing reliable and proper guidance of the actuating part in the pole core with low production costs.

This object is basically achieved by an actuating device where the actuating part is guided within the pole core along a ring body which seals the interior of the pole core and the pole tube connected to it relative to the exterior. The reliable enclosure guidance for an assignable peripheral guide surface of the actuating part is achieved with simultaneous sealing in the delicate region of the guide. If, for guidance of the medium and/or for obtaining a pressure equalization function between the actuating device and the valve, flows of media such as pneumatic portions of the pneumatic valve can be routed into the interior of the actuating device. The actuating part preferably has a center channel which, when routed past the sealing ring body, does not adversely affect its sealing and sliding function.

In one preferred embodiment of the actuating device according to the invention, the ring body, which is designed as a compression sleeve, is inserted into a recess of the pole core which with its one end communicates with the exterior. In this way, the ring guide body is located on the free end region of the rod-shaped actuating part and can support the free end for purposes of sliding support so that reliable actuating processes are ensured and impediments in operation are avoided.

Preferably, the ring body is held at least partially by a flanged edge of the pole core in its recess. In this way, by caulking in the free enclosure edge of the pole core which surrounds the actuating part for this purpose, positioning for the ring body can be produced by caulking in or crimping.

In another especially preferred embodiment of the actuating device according to the invention, in each travel position of the actuating part, a sealing part attached to its outer periphery is in sealing contact with the inner periphery of the ring body. As a result of the sleeve-like arrangement of the ring body, which on its inner peripheral side is provided preferably at least partially with a type of sliding layer or forms the sliding layer by itself, the sealing part, which is made preferably as an elastomer gasket, is protected against abrasive wear processes so that long-lasting sealing operation of the actuating device is implemented in this region.

Preferably at least along the possible travel distance of the sealing part and facing the interior of the pole core and pole tube, the outer periphery of the actuating part adjoins the assigned inner periphery of the ring body, forming a seal. Especially preferably viewed from the sealing part in the direction of the free end of the actuating part, the outside diameter of the actuating part is reduced relative to the outside diameter of the sealing part so that on one side of the ring body a functioning sealing distance is implemented and, on the opposite side, which is kept free, the ring body allows traveling operation without contact.

If the ring body has a preferably conical insertion aid preferably at least on its side facing the boundary wall of the recess, the ring body can be inserted especially easily into the recess. Preferably, the insertion aid is located on both sides of the ring body so that when the ring body is inserted, the installation direction need not be considered. If the pole core with its free face has a projection relative to the end side of the ring body directed toward the exterior, the ring body is protected against external influences, especially in the form of damage.

In one preferred embodiment of the actuating device according to the invention, the rod-shaped actuating part tapers proceeding from its sealing contact region with the ring body in the direction of the interior of the pole core and pole tube. As a result of this exposed region, which is preferably filled with the medium, center adjustment in the transition region to the sealing and sliding path of the actuating part within the ring body is achieved.

If the ring body is formed of a slippery material, especially of a thermoplastic material, it can be made light and can have correspondingly well-defined sealing and sliding properties.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure and which are schematic and not to scale:

FIG. 4a is a side elevational view in section of a part of the production form relating to the injection process of an actuating part onto the armature of the actuating device according to a second exemplary embodiment of the present invention;

FIG. 4b is a perspective view of the part of FIG. 4a;

FIG. 4c is a front elevational view of the part of FIG. 4a;

FIG. 5a is a side elevational view in section of a part of the production form relating to the injection process of an actuating part onto the armature of the actuating device according to a third exemplary embodiment of the present invention;

FIG. 5b is a perspective view of the part of FIG. 5a;

FIG. 5c is a front elevational view of the part of FIG. 5a;

FIG. 6b is a perspective view of the part of FIG. 6a;

FIG. 6c is a front elevational view of the part of FIG. 6a;

DETAILED DESCRIPTION OF THE INVENTION

Figure 1:
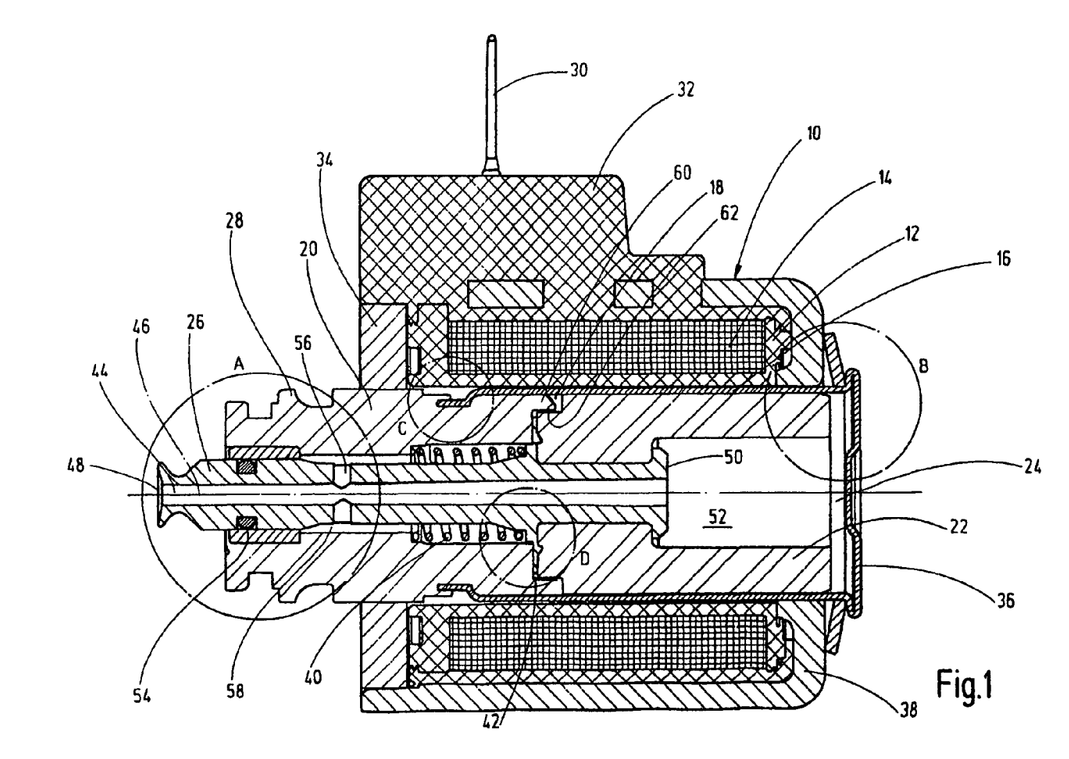
FIG. 1 is a side elevational view in section of an actuating device according to a first exemplary embodiment of the invention as a whole, without a connected valve device.

The actuating device which is shown in a longitudinal section in FIG. 1 and which is also referred to as an "actuating or switching magnet" has a housing 10 with a coil body 12 located therein with a coil winding 14. This coil body 12 comprises at least in part a pole tube 16 which is essentially magnetically decoupled from a pole core 20 by a point of separation 18 in the form of a site which is left open. The prior art also discloses solutions (not shown) in which a corresponding point of separation is formed by a weld or the like. Along the pole tube 16 an armature 22 is guided to be longitudinally displaceable in an armature space 24 which on its one free, front end interacts with a rod-shaped actuating part 26 for actuating fluid valves (not shown) of conventional design, especially in the form of pneumatic valves which are not detailed. To connect this valve, the pole core 20 on its free end is provided with a connecting flange 28. The connecting flange 28 on its outer periphery has depressed ring grooves for at least partially accommodating the corresponding elastomer gaskets and for routing the media flows.

To energize the coil winding 14 of the coil body 12, which preferably is formed of at least one conductive copper wire, there is a plug part 30 which is preferably permanently connected to the remaining parts of the housing 10 by a sealing compound 32. Viewed in the direction of FIG. 1, on the left side and to the outside, an annular pole plate 34 ending with the sealing compound 32 is inserted and is caulked accordingly for securely holding it in the housing 10. In addition, the pole plate 34 encompasses the outer periphery of the pole core 20, which is held in the installation position shown in FIG. 1 in the actuating device by the valve device (not detailed). The pole tube 16 is designed cup-like as a receiving sleeve. The bottom part 36 of the pole tube 16 forms a stop limit for the armature 22 in its travel position, which is on the extreme right viewed in the direction of FIG. 1. The sealing compound 32 together with the coil body 12 is formed of a plastic material such as, for example, polyamide, preferably PA6. The sealing compound 32 on the top side of the actuating device along its bottom side engages recesses of a cup-like housing jacket 38, which is likewise a component of the housing 10. Both the housing jacket 38 and the armature 22, as well as the pole core 20 and the pole plate 34, are formed of a metallic material, and all these parts can be formed of the same material. The pole tube 16 is preferably produced from a high-grade steel material which can be magnetically conductive or nonconductive depending on the application.

If the coil winding 14 and therefore the coil are energized by the plug part 30, the armature 22 then is moved into its actuated position shown in FIG. 1, that is, viewed in the direction of FIG. 1 from a right position into the left position which corresponds to the actuating position as shown in FIG. 1. In this traveling motion, the armature 22 entrains the rod-shaped actuating part 26 whose free end, for an actuating process on the pneumatic valve (not detailed) in each of its travel positions projects out of the housing 10 and particularly out of the pole core 20. In this traveling motion of the armature 22, viewed in the direction of FIG. 1 to the left, an energy storage device in the form of a compression spring 40 is pretensioned, and as soon as the coil winding 14 is kept de-energized, the pretensioned compression spring 40 pushes the armature 22 back into its right initial position in which it can also make contact with the inside of the bottom part 36 of the pole tube 16. In this de-energized state, the connected valve device is switched open, de-energized. In one modified embodiment (not shown) of the actuating device according to the invention, it could also be provided that the energy storage device in the form of the compression spring 40 be moved into the connected valve device in order to induce the indicated reset motion of the armature 22 together with the actuating part 26.

Even when the current drops out, as a result of residual magnetism processes in the pole core 20 and in the pole plate 34, it can happen that the armature 22 with its one free face remains adhering to the adjacent face of the pole core 20 facing it. To avoid this, between the two faces within the armature space 24 an anti-adhesion device 42 is inserted which encompasses the rod-like actuating part 26 with a radial distance in order to effectively execute decoupling. The rod-shaped actuating part 26 is penetrated by a center channel 44 which extends along the longitudinal axis 46 of the armature 22 and the actuating part 26, which in this case also forms the optional axis of motion. The middle channel 44 thus emerges into the exterior on the two opposite faces 48, 50 of the actuating part 26. In particular, the center channel 44 on the right face 50 of the actuating part 26 leads into an open space 52 of the armature 22. The open space 52 in turn leads into the armature space 24, carrying pressure and medium. In the region between a sealing site 54, which also forms a guide for the front end of the actuating rod 26 and the armature 22, there is a cross channel 56 having one end discharging into the center channel 44 and its other end emerging into a center space 58 which is encompassed by the pole core 20.

The components including the center channel 44, cross channel 56, center space 58, open space 52, and armature space 24 form a type of pressure equalization system which is connected to a valve unit (not detailed) compensating the pressure media originating from the valve unit such that the travel motion of the armature 22 together with the actuating part 26 is not adversely affected by possible pressure differences. Optionally, the pressure media guided in this way can also effectively support the actuating force to be applied by the armature 22 as a result of different area ratios. In the region of the point of separation 18, the pole core 20 with a lug-shaped annular projection 60 overlaps the stepping 62 of the armature 22 offset in this region such that in each travel position of the armature 22 it is guided within the annular projection 60 so that the size of the point of separation 18 changes depending on the direction of travel of the armature 22.

Figure 3:
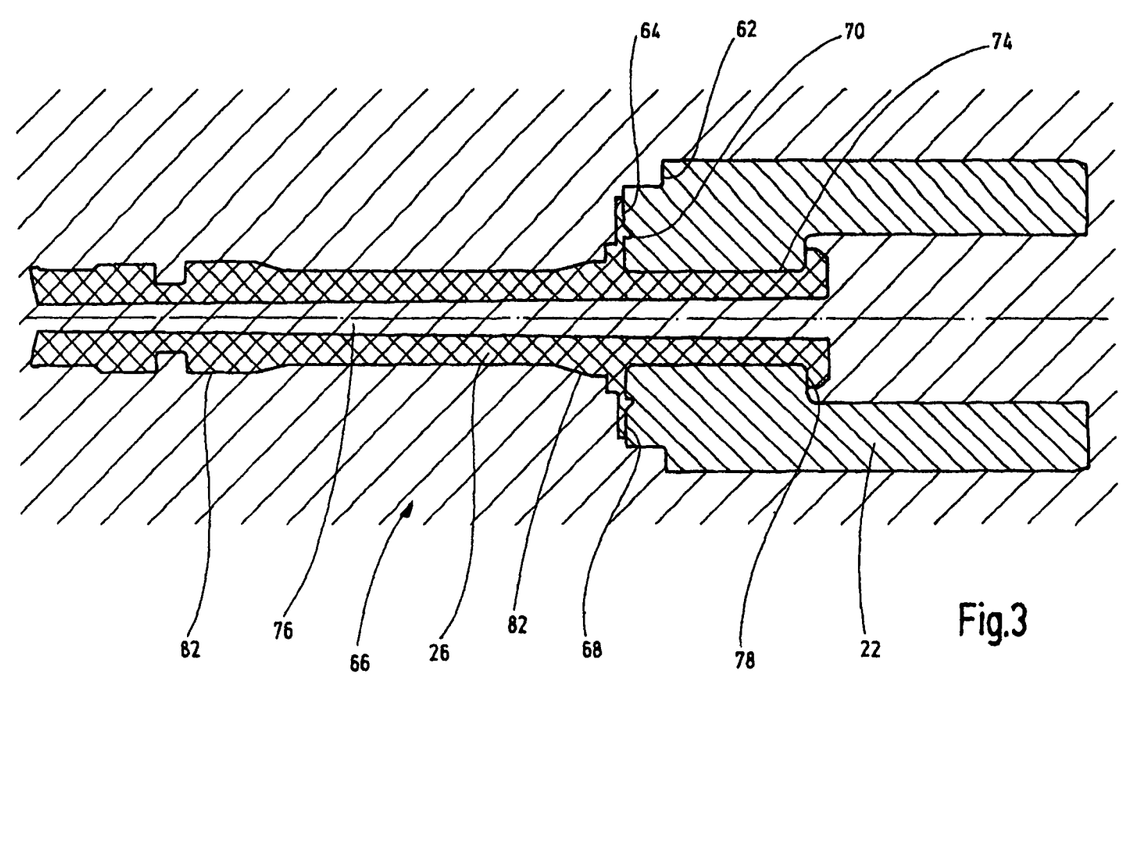
FIG. 3 is a side elevational view in section of part of the production form relating to the injection process of an actuating part onto the armature of the actuating device of FIG. 1.

The rod-shaped actuating part 26 is formed from an injectable material which is injected onto the armature 22, especially as shown in FIG. 3 in a connecting region 64. When reference is made here to injection, this includes conventional injection, casting, and diecasting methods. The injectable material of the actuating part 26 can fundamentally be any material which can be processed in this way. Preferably, a plastic material is used, especially a thermoplastically processable plastic. The use of polybutylene terephthalate (PBT) has proven especially advantageous. It allows injection molding at mass temperatures from 230° C. to 270° C. The plastic material used has the necessary strength and stiffness. The sliding and wear behavior has proven very good in practical tests for the application under consideration here. In this exemplary embodiment, the entire actuating part 26 is formed from an injectable plastic material; but here it is also possible to form the actuating part 26 in the front region from a conventional metal rod material, which is then injected only in the transition region to the armature 22 by injectable material.

Figure 2:
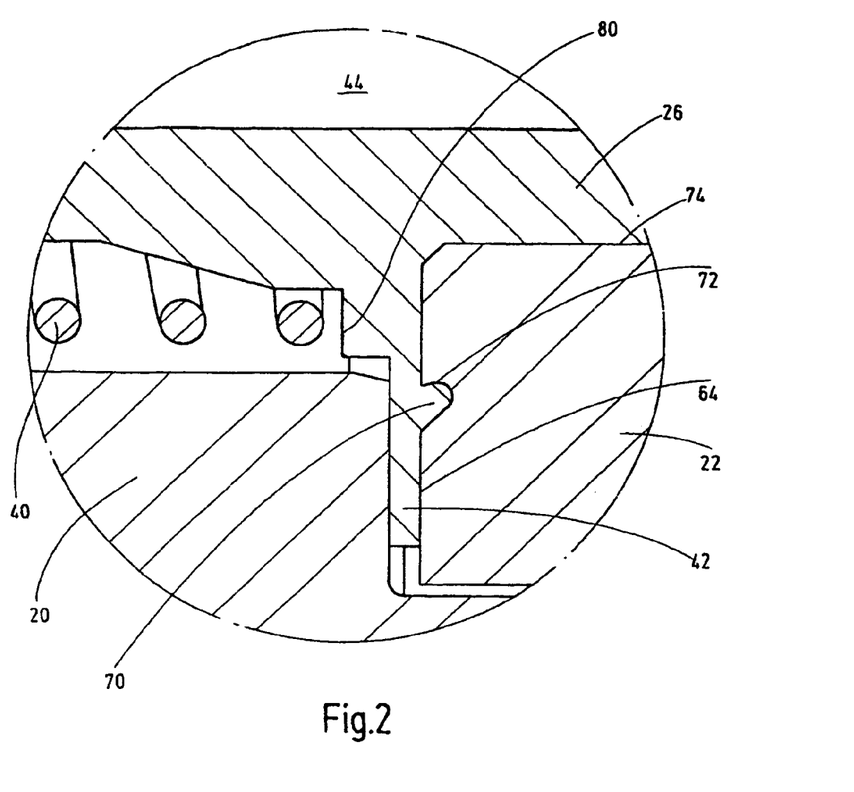
FIG. 2 is an enlarged partial side elevational view in section of the actuating device portion in the circle D in FIG. 1.

FIG. 3 shows an injection mold 66, in part and in its fundamental structure. For the mold removal process this injection mold 66 is made in several parts (not shown) and can be assembled with its parts into the complete mold as shown in FIG. 3. The metal armature 22 is inserted into the injection mold 66 and on its free face forms the connection region 64. The possible injection surface 68 formed in this way is delimited to the outside by the wall of the injection mold 66 and is chosen such that it at least does not project above the free face of the armature 22 in this region. Furthermore, within the injection surface 68 a peripheral, annular groove-like depression 70 is made in the free face of the armature 22. As shown enlarged in FIG. 2, it forms a type of undercut configuration 72 so that the injected plastic material can be held accordingly in the undercut in the armature 22 along the connecting region 64 by hooking underneath. Furthermore, the armature 22 has a centrally extending center opening 74 which is penetrated by the actuating part 26, as shown in FIG. 3, a correspondingly inserted mold core 76 enabling this configuration. Since the center opening 74 emerges into the widening open space 52, another support surface is formed there as the second injection surface 78 of the armature 22. In the region of the second injection surface 78, the plastic material of the fastening part 26 overlaps the widening step formed here so that in the two directions of travel of the armature 22 secure anchoring of the actuating part 26 by the injection process is ensured.

The injection mold 66 as shown in FIG. 3 is designed so that the rod-shaped actuating part 26 widens radially to the outside with the formation of the already described disk-like anti-adhesion means 42. In this case, the pole core 20 is reliably decoupled from the armature 22. The anti-adhesion means 42 also forms a type of stop protection for the armature 22. As FIG. 2 in particular shows, between the disk-shaped anti-adhesion device 42 and the remaining enclosure front of the actuating part 26, a stop step 80 is formed on which one free end of the energy storage device in the form of the compression spring 40 is supported. In this respect, the actual anti-adhesion means 42 is relieved of the force applied by the compression spring 40, which otherwise in any travel position of the armature 22 presses the rod-like actuating part 26 in the direction of the connecting region 64 of the armature 22. As furthermore follows from FIGS. 1 and 3, the center space 58 tapers to both sides by the rod-shaped actuating part 26 widening conically in diameter along two transition regions 82.

Figures 4A, 4B, 4C:
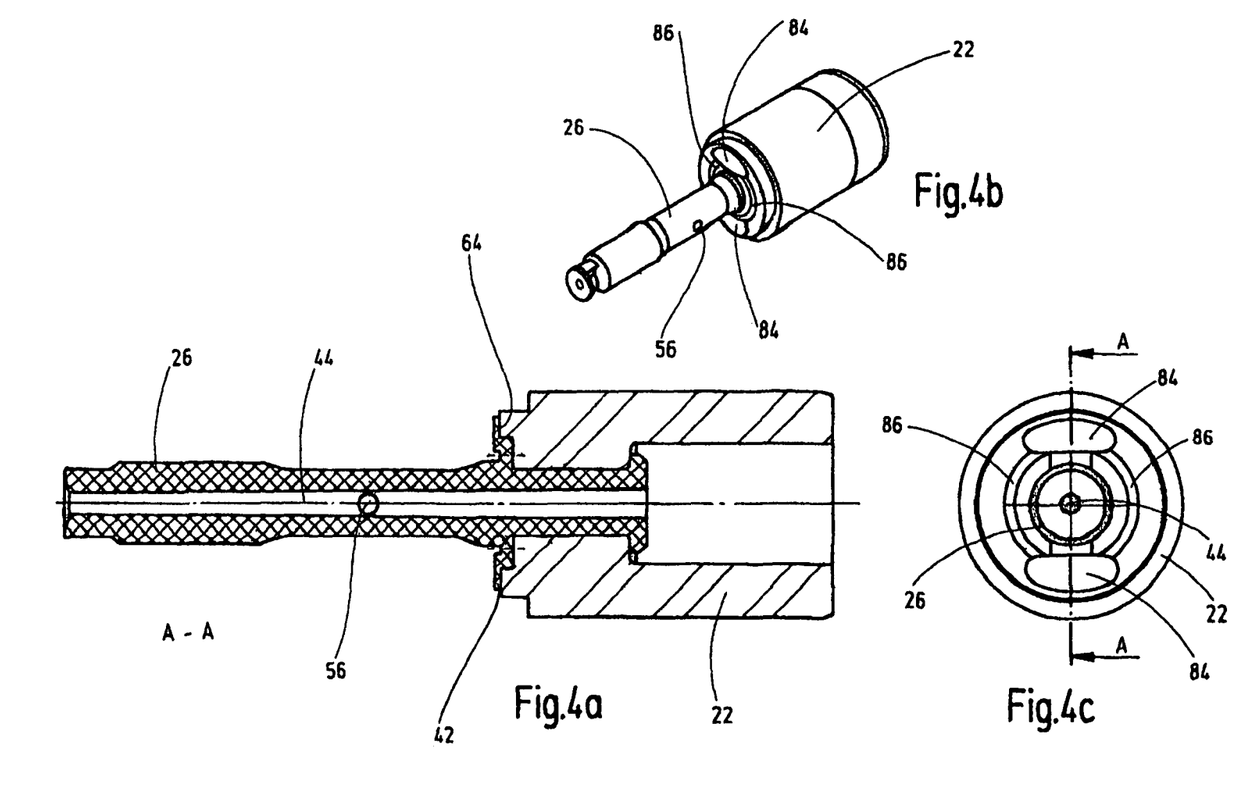

The embodiment as shown in FIGS. 4a-c is at least modified such that in the connecting region 64 the injected plastic material has kidney-shaped widenings 84 to increase the linking mass. In turn the anti-adhesion device 42 is a one-piece component of the actuating part 26. As a result of the diametrically opposite annular depression sites 86 which adjoin the kidneys 84 on both sides as circle segments, the energy storage device in the form of the compression spring 40 need not rest entirely on the injected plastic material. For improved support, it can be directly supported on the metal regions of the armature 22.

Figures 5A, 5B, 5C:
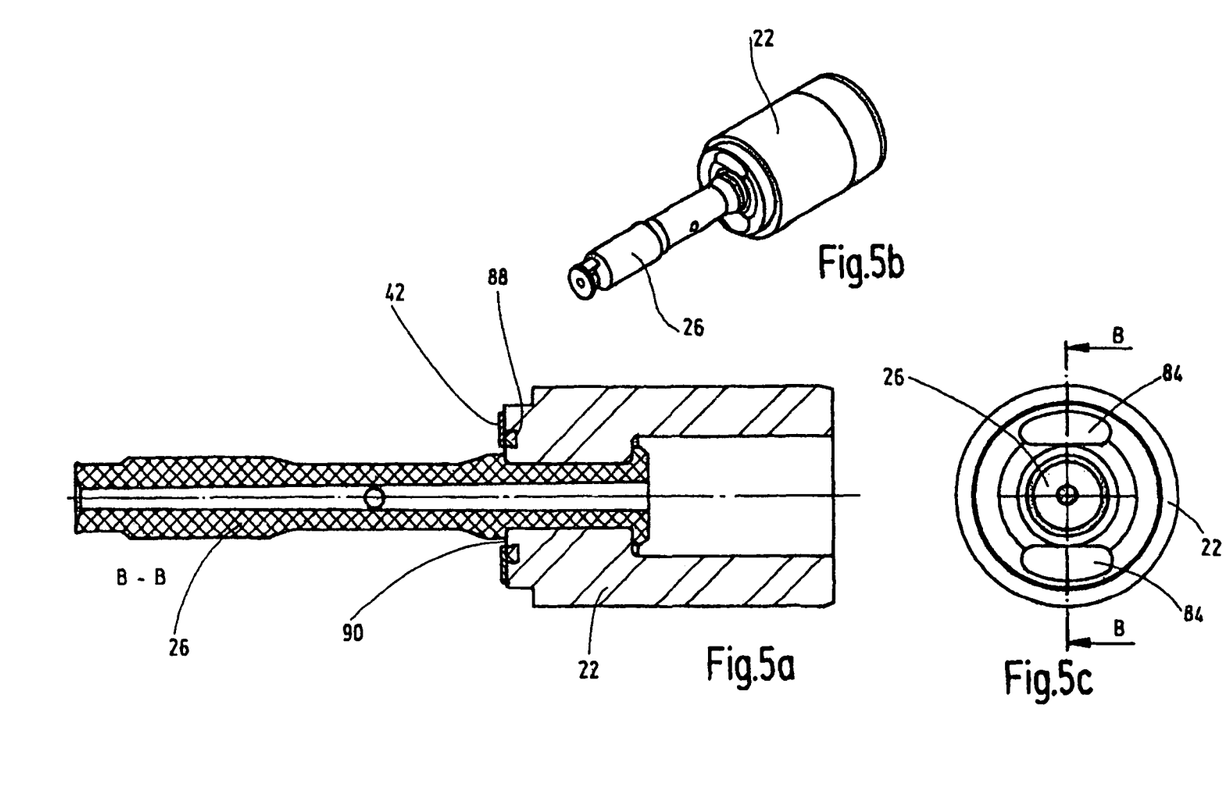

The embodiment as shown in FIGS. 5a-c corresponds in terms of its fundamental structure to the embodiment as shown in FIG. 4. The anti-adhesion device 42 is securely connected on the face side as an anti-sticking washer via a corresponding engagement site 88 to the armature 22. In this case, the compression spring 40 with its one end directly adjoins the face of the armature 22 in the region of the annular gap 90, formed by the intermediate distance from the outer periphery of the fastening part 26 to the inner periphery of the anti-sticking washer of the anti-adhesion device 42, which has been formed independently.

Figure 6A:
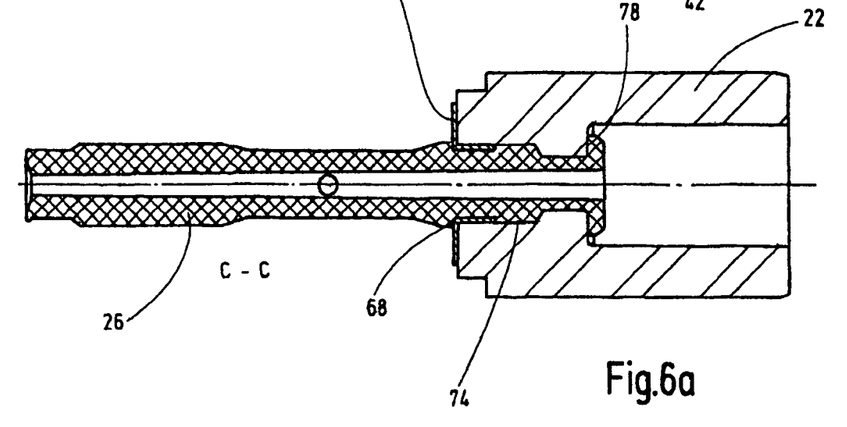
FIG. 6a is a side elevational view in section of a part of the production form relating to the injection process of an actuating part onto the armature of the actuating device according to a fourth exemplary embodiment of the present invention.
Figure 6B:
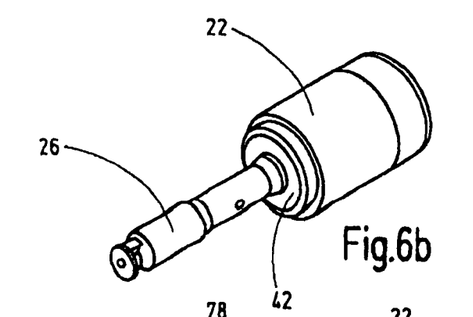
Figure 6C:
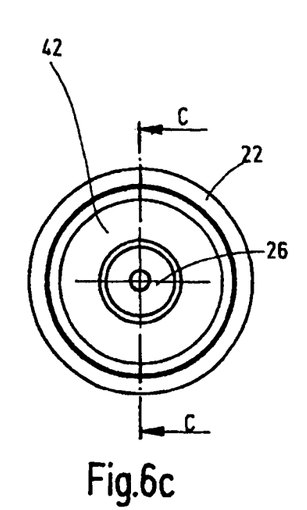

In the embodiment as shown in FIGS. 6a-c, in turn the anti-adhesion device 42 is formed of an anti-sticking cup which with its radial enclosure edge adjoins the face of the armature 22 and otherwise engages the middle opening 74 of the armature 22 with its bottom part which is cylindrically arched inward. In this respect, the actuating part 26 with its injectable plastic material only in the region of the second injection surface 78 directly adjoins the armature 22. The first injection surface 68 is formed by the contact with the top side of the indicated anti-adhesion device 42.

Figure 7:
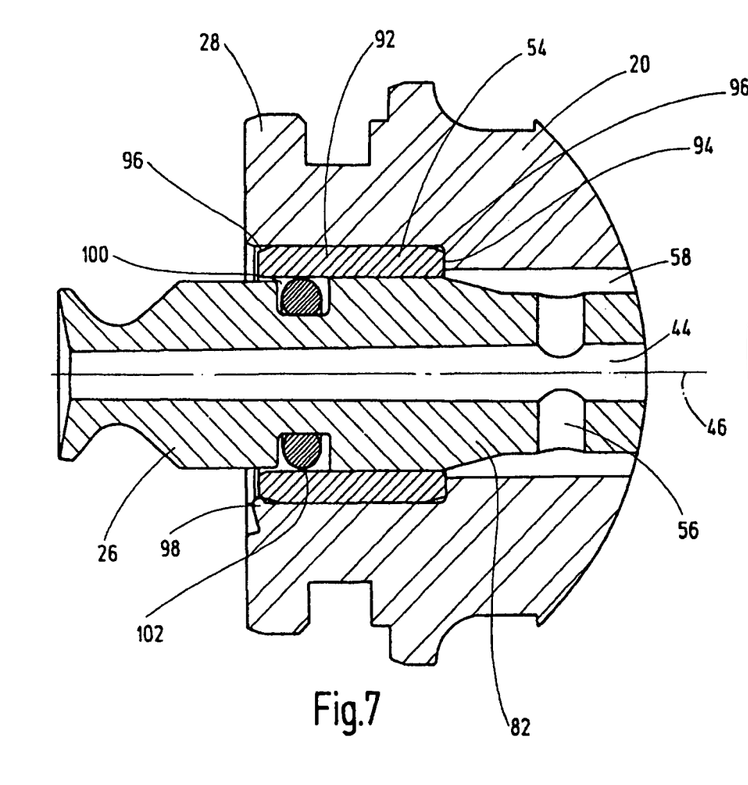
FIG. 7 is an enlarged partial side elevational view in section of the actuating device shown in circle A in FIG. 1.

FIG. 7 shows the actuating device with the sealing site 54 which seals the center space 58 to the outside relative to the free surrounding space into which the free end of the actuating part 26 projects. The sealing site 54 is formed from a ring body 92 which is inserted into a shoulder-like widening 94 on the free end of the pole core 20, specifically, is pressed in there. For this pressing process, the ring body 92 toward its two free ends has conical insertion aids 96. The ring body 92 is formed from a material with good sealing and sliding properties. In addition to injectable plastics such as polyamide, nonferrous metal materials could also be used. To the extent good sliding properties are required, a PTFE material can also form the ring body 92. So that the ring body 92 remains securely in the receiver in the pole core 20, the pole core 20 can moreover be at least partially flanged along its free inner region so that the flange edge sections 98 to the outside form an effective stop boundary. The flange edge can also be made circumferential instead of the sectional configuration.

As FIG. 7 further illustrates, an elastomer gasket 102 is inserted into an annular groove 100 and ensures sealing between the center space 58 and the free exterior. Moreover, between the annular groove 100 and the adjacent transition region 82 of the actuating part 26, the diameter of the actuating part is widened and hence is in direct sliding contact with the inside of the ring body 92 which is preferably made as a compression sleeve. This yields additional sealing next to the elastomer gasket 102 and ensures exact, end-side guidance for the actuating part 26 along the longitudinal or travel axis 46. On the side to the transition region 82 facing away, conversely, the outside diameter of the actuating part 26 is reduced in order to ensure unobstructed operation and to avoid any adverse effect on the entry process of the actuating part 26 at the site of the transition to the ring body 92.

Figure 8:
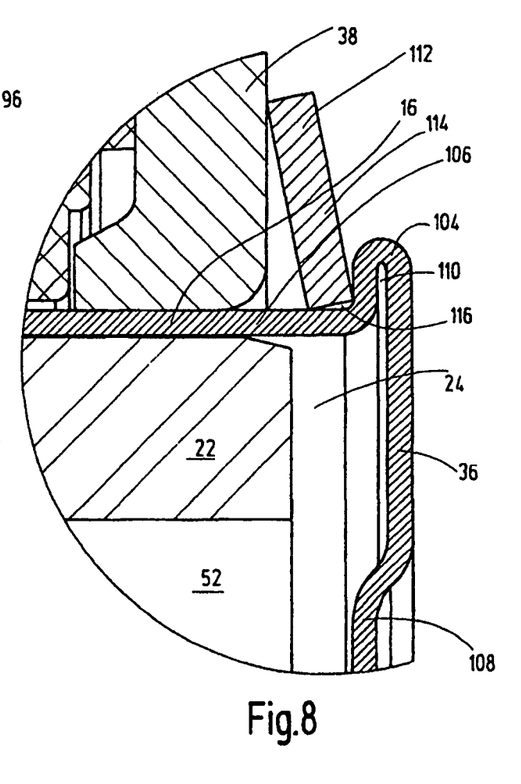
FIG. 8 is an enlarged partial side elevational view in section of the actuating device shown in circle B in FIG. 1.

As shown especially by FIG. 8 in conjunction with FIG. 1, the pole tube 16, which viewed in the direction of figures emerges on the right edge from the jacket 38 of the housing 10, is provided with a widened and deflected edge 104 which extends with a definable axial distance to the outside wall of the housing jacket 38. This configuration forms a type of loose bearing point. The edge 104 formed in this way forms the transition site between the cylindrical pole tube wall 106 and the bottom part 36 which extends transversely to it. Toward its middle, the bottom part 36 in the direction of the armature space 24 is provided with an offset 108 which projects in the right stop position of the armature 22 into its open space 52. Otherwise, the elastically resilient bottom part 36 forms a stop cushioning for the striking armature 22 if it assumes its travel position on the extreme right as shown in FIG. 1.

The flanged edge 104 enhances this effect by forming an elastically resilient articulation. A peripheral gap 110, into which medium can travel, leads into the edge 104 formed in this way. This in turn promotes stiffening of the entire system in this region. It is especially advantageous that for the pole tube 16 in any temperature state, tolerance equalization is created by an elastically resilient reset 112 in the form of an energy storage device, for example, formed from components of a disk spring 114, of which FIG. 8 shows one segment part. Instead of the individual segment disk springs 114 as shown in FIG. 8, essentially, however, there could be a disk spring assembly or other reset devices, for example, in the form of a conventional helical spring which acts as a compression spring. A spring bellows or a pretensioned elastomer ring could also be used here if its use were possible at all based on the prevailing temperatures.

The reset 112, preferably in the form of a disk spring 114. One reset end acts effectively on the free face of the housing jacket 38 and is supported with the other free end on a deflection region 116 at which the cylindrical pole tube wall 106 passes into the projecting edge 104. With respect to a high degree of corrosion resistance, the pole tube 16 is formed from a high-grade steel material. The reset 112 used also has the advantage that when vibrations occur on the actuating device, the pole tube 16 is decoupled relative to the housing 10. The projection selected to the right for the edge 104 relative to the free face of the housing jacket 38 is chosen such that the respective reset 112 with its pretensioning can reliably act on the pole tube 16 and that the latter can be located on the remaining housing 10, saving installation space. The indicated offset 108, moreover, ensures that the pole tube 16 is reinforced in its pertinent bottom part region 36 so that residual deformations cannot occur in the event of striking of the armature 22.

Figure 9:
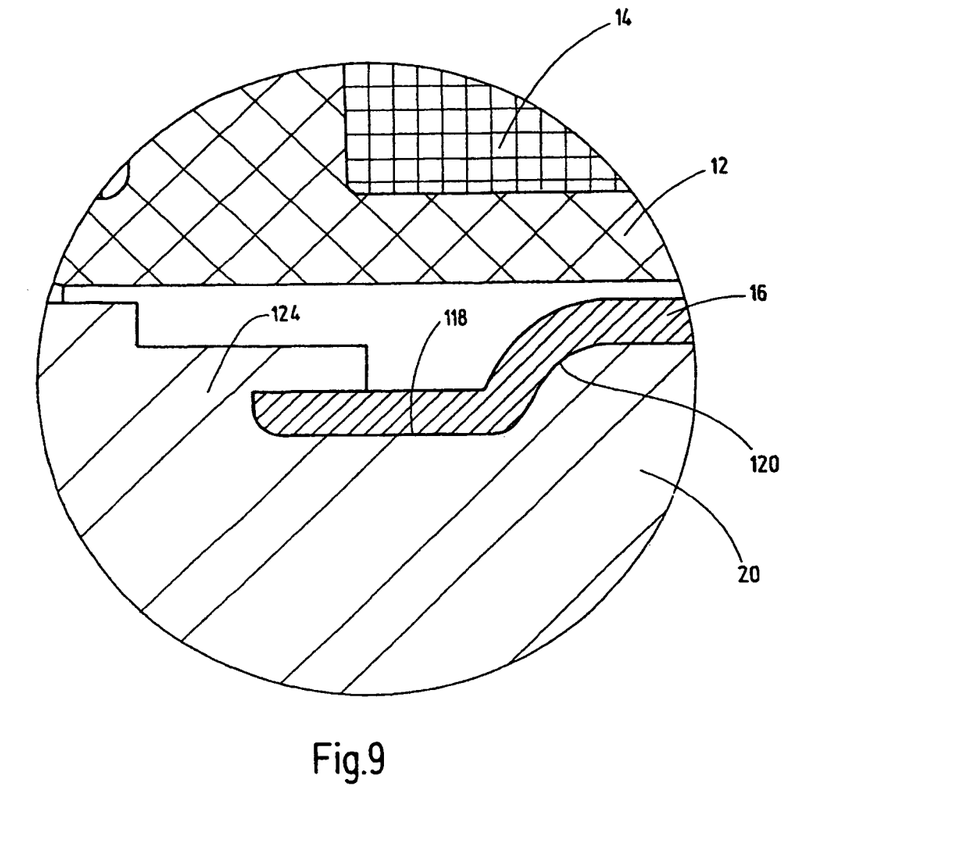
FIG. 9 is an enlarged partial side elevational view in section of the actuating device shown in circle C in FIG. 1.
Figure 10:
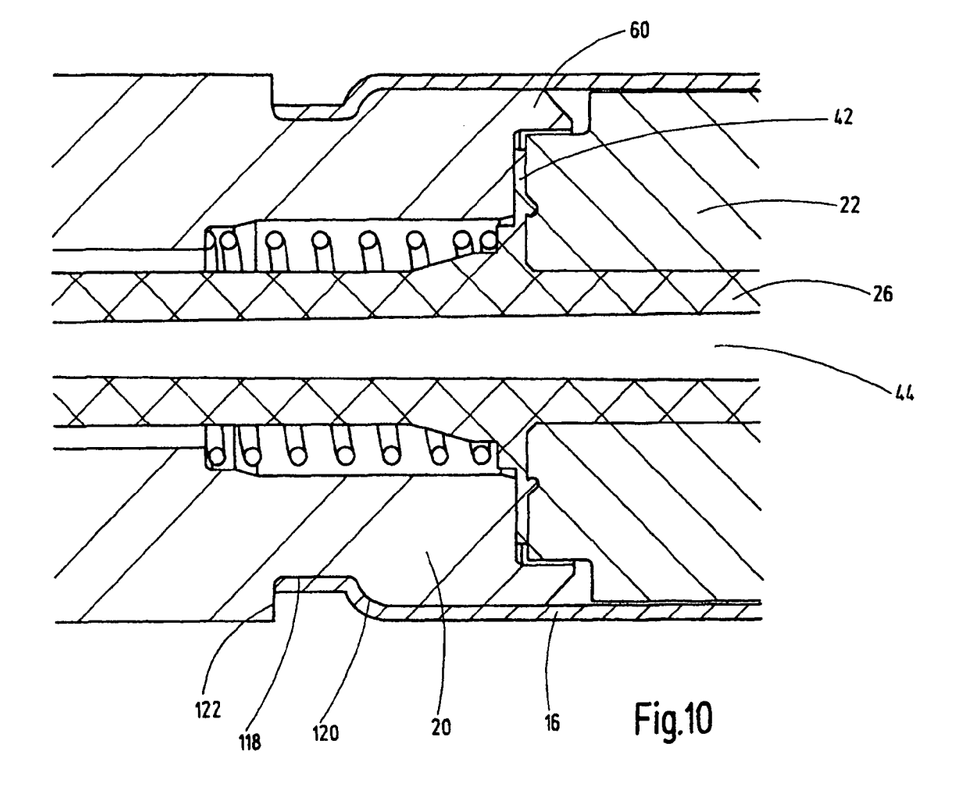
FIGS. 10 and 11 are enlarged partial side elevational views in section of the individual production steps for the actuating device of FIG. 9.
Figure 11:
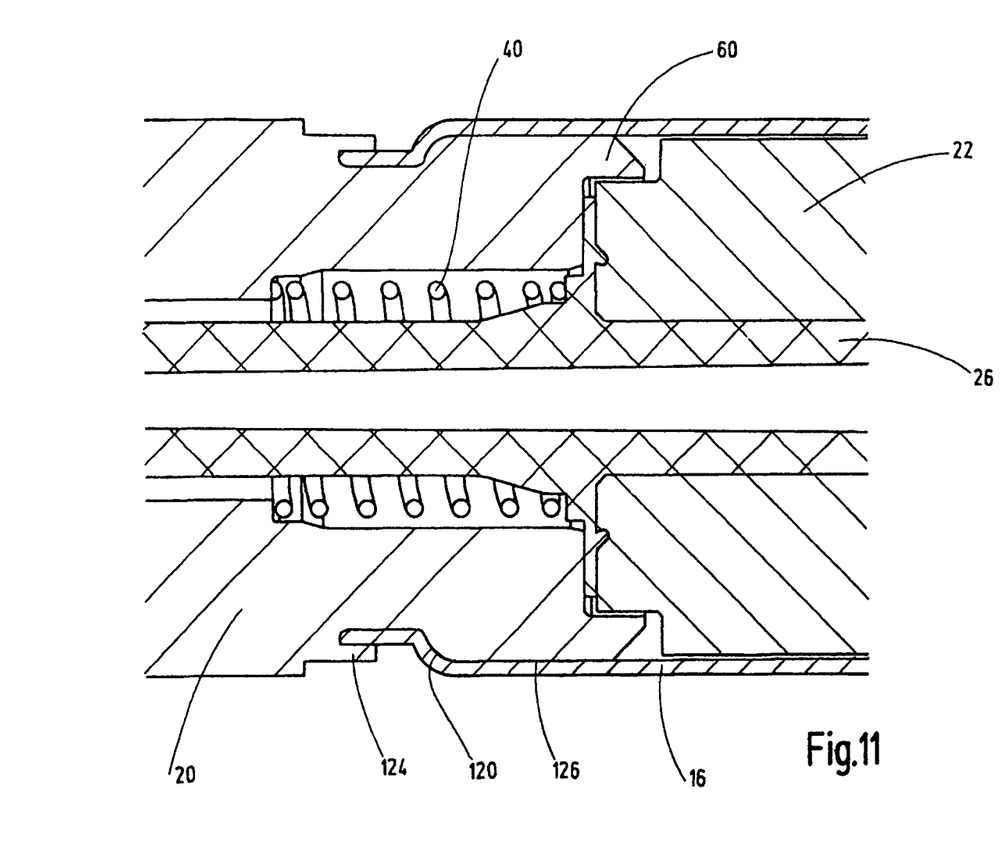

The solution, as shown in FIGS. 9 to 11, shows the left linking site of the pole tube 16 to the stationary pole core 20 as a fixed bearing point. For this purpose, the pole core 20 in the direction of its annular projection 60 has an annular groove-shaped constriction site 118 which passes into the remaining outside diameter of the pole tube 20 in the direction of the annular projection 60 in an arc-shaped transition region 120 (cf. FIG. 1). FIG. 10 shows that the step-shaped transition region 122 facing away from the arc-shaped transition region 120 is initially undeformed and here forms only an abutting region for the free end of the free end edge of the pole tube 16 which is flanged or caulked. When this production step is completed, as shown in FIG. 11, in a second production step the step-shaped transition region 122 is caulked to the inside along a caulk surface 124 which is offset in the direction of the pole plate 34 relative to the remaining outside diameter of the pole core 20. In this way, the free end of the pole tube 16 is fixed not only axially and radially from both sides by the pole core material which is caulked in this region, but is also kept gas-tight, i.e., the solution shown here manages without an additional elastomer gasket or other sealing system between the pole core 20 in the region of its annular projection 60 and the fixing site on the free end edge of the pole tube 16.

Since these actuating devices are also used to some extent in the high temperature range, and this fundamentally damages the elastomer material of seals, a cost-favorable sealing alternative is implemented here. Due to the arc-shaped transition region 120, moreover, the pole tube is reliably guided without major kinks in the direction of the annular projection 60 on the outer periphery of the pole tube 22 so that unnecessary material stress for the thin-walled pole tube material does not occur. With respect to this guide distance 126 and the guide centering by way of the reset 112 on the free end region of the pole tube 16, it is ensured that bulging processes which could possibly limit the free mobility of the armature 22 with its actuating part 26 do not occur.

The actuating device according to the invention is intended especially in the low pressure range for use in pneumatic valves even in the high temperature range. With a corresponding modification, however, other applications are also conceivable, especially for hydraulic valves. The very lightweight actuating device has very short switching and reaction times. Extremely high load cycles, which can be in the range of multiples of millions, can be achieved.

While various embodiments have been chosen to illustrate the invention, it will be understood by those skilled in the art that various changes and modifications can be made therein without departing from the scope of the invention as defined in the appended claims.

What is claimed is:

1. An actuating device for actuating externally connected valves, comprising:
    a housing;
    a coil body with a coil winding in said housing;
    a pole tube enclosed at least in part by said coil body and having a free end;
    an armature connected to said free end of said pole tube and guided for longitudinal displacement within an armature space in said pole tube, said armature interacting with an actuating part for actuating a valve part, said actuating part being guided within a pole core along a ring body sealing an interior of said pole core and said pole tube connected to pole core relative to an exterior of said housing, said ring body including a compression sleeve, being inserted into a recess of said pole core and having one end communicating with said exterior;
    a sealing part attached to an outer periphery of said actuating part and in sealing contact with an inner periphery of said ring body in each travel position of said actuating part, said sealing part being an elastomeric gasket located in a groove in said actuating part; and
    a flanged edge of said pole core at least partially holding said ring body in said recess.

2. An actuating device according to claim 1 wherein said outer periphery of said actuating part adjoins said inner periphery of said ring body forming a seal at least along a possible travel distance of said sealing part.

3. An actuating device according to claim 1 wherein a free face of said pole core has a projection relative to an end side of said ring body directed toward said exterior.

4. An actuating device according to claim 1 wherein said ring body is formed of a slippery material.

5. An actuating device according to claim 4 wherein said slippery material is a thermoplastic material.

6. An actuating device for actuating externally connected valves, comprising:
    a housing;
    a coil body with a coil winding in said housing;
    a pole tube enclosed at least in part by said coil body and having a free end;
    an armature connected to said free end of said pole tube and guided for longitudinal displacement within an armature space in said pole tube, said armature interacting with an actuating part for actuating a valve part, said actuating part being guided within a pole core along a ring body sealing an interior of said pole core and said pole tube connected to pole core relative to an exterior of said housing;
    a sealing part attached to an outer periphery of said actuating part and in sealing contact with an inner periphery of said ring body in each travel position of said actuating part, said sealing part being an elastomeric gasket located in a groove in said actuating part; and
    an outside diameter of said actuating part being reduced relative to an outside diameter of said sealing part from said sealing part in a direction of a free end of said actuating part.

7. An actuating device according to claim 6 wherein said ring body comprises a compression sleeve, is inserted into a recess of said pole core and has one end communicating with said exterior.

8. An actuating device according to claim 7 wherein a flanged edge of said pole core at least partially holds said ring body in said recess.

9. An actuating device for actuating externally connected valves, comprising:
    a housing;
    a coil body with a coil winding in said housing;
    a pole tube enclosed at least in part by said coil body and having a free end;
    an armature connected to said free end of said pole tube and guided for longitudinal displacement within an armature space in said pole tube, said armature interacting with an actuating part for actuating a valve part, said actuating part being guided within a pole core along a ring body sealing an interior of said pole core and said pole tube connected to pole core relative to an exterior of said housing; and
    a sealing part attached to an outer periphery of said actuating part and in sealing contact with an inner periphery of said ring body in each travel position of said actuating part, said sealing part being an elastomeric gasket located in a groove in said actuating part, said ring body including a compression sleeve, being inserted into a recess of said pole core and having one end communicating with said exterior, said ring body having a conical insertion at least on a side of said ring body facing a boundary wall of said recess.

10. An actuating device for actuating externally connected valves, comprising:
    a housing;
    a coil body with a coil winding in said housing;
    a pole tube enclosed at least in part by said coil body and having a free end;
    an armature connected to said free end of said pole tube and guided for longitudinal displacement within an armature space in said pole tube, said armature interacting with an actuating part for actuating a valve part, said actuating part being guided within a pole core along a ring body sealing an interior of said pole core and said pole tube connected to pole core relative to an exterior of said housing; and
    a sealing part attached to an outer periphery of said actuating part and in sealing contact with an inner periphery of said ring body in each travel position of said actuating part, said sealing part being an elastomeric gasket located in a groove in said actuating part, said outer periphery of said actuating part adjoining said inner periphery of said ring body forming a seal at least along a possible travel distance of said sealing part, said actuating part being rod-shaped and tapering from a sealing contact region thereof with said ring body in a direction of said interior of said pole core and said pole tube.

* * * * *